US009247552B2

(12) United States Patent
Teng et al.

(10) Patent No.: US 9,247,552 B2
(45) Date of Patent: Jan. 26, 2016

(54) ALLOCATION OF RESOURCES IN A COMMUNICATION SYSTEM

(75) Inventors: Yong Teng, Beijing (CN); Kari Veikko Horneman, Oulu (FI); Xiaojin Zheng, Shanghai (CN); Jiang Wang, Shanghai (CN); Jing Xu, Shanghai (CN)

(73) Assignee: Nokia Solutions and Networks Oy, Espoo (FI)

( * ) Notice: Subject to any disclaimer, the term of this patent is extended or adjusted under 35 U.S.C. 154(b) by 217 days.

(21) Appl. No.: 13/885,010

(22) PCT Filed: Nov. 12, 2010

(86) PCT No.: PCT/CN2010/078670
§ 371 (c)(1),
(2), (4) Date: May 13, 2013

(87) PCT Pub. No.: WO2012/061994
PCT Pub. Date: May 18, 2012

(65) Prior Publication Data
US 2013/0237268 A1    Sep. 12, 2013

(51) Int. Cl.
*H04W 72/08*    (2009.01)
*H04L 5/00*    (2006.01)

(52) U.S. Cl.
CPC ........... *H04W 72/082* (2013.01); *H04L 5/0032* (2013.01); *H04L 5/0058* (2013.01)

(58) Field of Classification Search
CPC ..... H04L 5/0032; H04L 5/003; H04L 5/0033; H04L 5/0035; H04L 5/0037; H04L 5/0039; H04L 5/0041; H04L 5/0042; H04L 5/0058; H04W 72/082; H04W 72/08; H04W 72/085; H04W 72/087

USPC ........... 455/509, 7, 69, 522, 450, 452.1, 451, 455/13.4, 67.11, 524; 375/219, 222, 252, 375/260; 370/468, 336
See application file for complete search history.

(56) References Cited

U.S. PATENT DOCUMENTS

2004/0066761 A1*  4/2004  Giannakis et al. ............ 370/329
2005/0220178 A1* 10/2005  Ginis ............................ 375/219
(Continued)

FOREIGN PATENT DOCUMENTS

| CN | 101083553 A | 12/2007 |
|----|-------------|---------|
| CN | 101516065 A | 8/2009  |
| CN | 101588627 A | 11/2009 |

OTHER PUBLICATIONS

Hao Dandan, et al.; "A Cross-Layered Scheduling and Resource Allocation Algorithm in OFDMA Systems"; Chinese Journal of Electronics, vol. 36, No. 10, Oct. 2008, pp. 1923-1930.
(Continued)

*Primary Examiner* — Tan H Trinh
(74) *Attorney, Agent, or Firm* — Harrington & Smith

(57) ABSTRACT

A method and an apparatus for resource allocation in a local wireless node of a system of a plurality of local wireless nodes is disclosed. An inner circle subgradient resource allocation iteration is performed based on information received from at least one other wireless node of the system and an iteration parameter until a convergent result. An updated iteration parameter is provided by at least one outer circle subgradient iteration based on the convergent result of the inner circle subgradient resource allocation iteration. The inner circle subgradient resource allocation iteration is then repeated at least once using the updated iteration parameter until a convergent result. Resources are then allocated based on the iterations.

27 Claims, 8 Drawing Sheets

(56) References Cited

U.S. PATENT DOCUMENTS

| | | | |
|---|---|---|---|
| 2006/0062288 A1* | 3/2006 | Hester | 375/222 |
| 2008/0219369 A1 | 9/2008 | Wu et al. | |
| 2008/0298486 A1 | 12/2008 | Venturino et al. | 375/260 |
| 2009/0034554 A1* | 2/2009 | Evans et al. | 370/468 |
| 2009/0040985 A1* | 2/2009 | Barnawi et al. | 370/336 |
| 2009/0207768 A1* | 8/2009 | Wang et al. | 370/311 |
| 2009/0213741 A1* | 8/2009 | Wang et al. | 370/252 |
| 2009/0247067 A1* | 10/2009 | Li et al. | 455/7 |
| 2010/0009710 A1 | 1/2010 | Zhang et al. | 455/522 |

OTHER PUBLICATIONS

Hu Hao, et al.; "Utility-based resource allocation and scheduling for CR-MIMO-OFDMA/TDM system" Journal on Communications, vol. 31, No. 7, Jul. 2010, pp. 1-8.

Zhang Xin, et al.; "Adaptive resource allocation strategy of relay OFDMA systems"; Journal of South China University of Technology (Natural Science Edition), vol. 38, No. 9, Sep. 2010, pp. 7-12.

Qianxi Lu, et al.; "Optimal Subcarrier and Power Allocation under Interference Temperature Constraints"; IEEE International Conference on Wireless Communications and Networking Conference; Apr. 2009, pp. 1-5.

\* cited by examiner

ALLOCATION OF RESOURCES IN A COMMUNICATION SYSTEM

This disclosure relates to resource allocation in a communication system comprising a plurality of wireless nodes, and more particularly, but not exclusively, to distributed resource allocation for controlling interference.

A communication system can be seen as a facility that enables communication sessions between two or more entities such as fixed or mobile communication devices, base stations, servers and/or other communication nodes. A communication system and compatible communicating entities typically operate in accordance with a given standard or specification which sets out what the various entities associated with the system are permitted to do and how that should be achieved. For example, the standards, specifications and related protocols can define the manner how communication devices can access the communication system and how various aspects of communication shall be implemented between communicating devices.

Communications can be carried on wired or wireless carriers. In a wireless communication system at least a part of the communication between at least two stations occurs over a wireless link. Examples of wireless systems include public land mobile networks (PLMN) such as cellular networks, satellite based communication systems and different wireless local networks, for example wireless local area networks (WLAN). A wireless system can be divided into cells, and hence these are sometimes referred to as cellular systems. In a wireless system a base station provide radio coverage for user in it service area and such area can be called radio service area or access area. Neighbouring radio service areas typically overlap, and thus a device in an area can often listen to more than one base station.

A user can access the communication system by means of an appropriate communication device. A communication device of a user is often referred to as user equipment (UE) or terminal. A communication device is provided with an appropriate signal receiving and transmitting arrangement for enabling communications with other parties. In wireless systems a communication device provides a transceiver station that can communicate with another communication device such as e.g. a base station and/or another user equipment.

An example of communication systems is an architecture that is being standardized by the 3rd Generation Partnership Project (3GPP). This system is often referred to as the long-term evolution (LTE) of the Universal Mobile Telecommunications System (UMTS) radio-access technology. A further development of the LTE is often referred to as LTE-Advanced. The various development stages of the 3GPP LTE specifications are referred to as releases.

A communication system can be provided by means of different types of radio service areas. For example, in LTE-Advanced the network nodes can be provided by wide area network nodes such as macro eNode Bs (eNB) which may, for example, provide coverage for an entire cell or similar radio service area. Network nodes can also comprise smaller or local radio service area network nodes, for example Home eNBs (HeNB) or pico eNodeBs (pico-eNB). The smaller radio service areas can be located wholly or partially within the larger radio service area. Local nodes may also provide service areas such that they overlap with each other. The nodes of the smaller radio service areas such as the HeNBs may be configured to support local offload. The local nodes can also, for example, be configured to extend the range of a cell. In some instances a combination of wide area network nodes and small area network nodes can be deployed using the same frequency carriers (e.g. co-channel deployment).

The HeNBs or other local nodes can be deployed arbitrarily. For example, nodes operated by different operators can be arbitrarily deployed in an indoor environment, such as an office block. The nodes can choose the same frequency bands without coordination. The arbitrary nature of deployment of local nodes can be a potential cause for interference. With the increase on the number of local nodes that can be powered on, the existing nodes may suffer from excessive aggregate interference from other nodes operating nearby. This may be the case in particular if the nodes operate on the same frequency band(s). This can decrease the efficiency and even prevent proper operation of the existing nodes. This issue could be solved by increasing the frequency resources and assigning different frequency resources to different nodes. However, this may in turn set high demands on the spectrum resources, and thus may not considered realistic in all circumstances.

To mitigate the interference caused by different HeNBs using the same frequency bands, various spectrum usage (FSU) schemes which include both spectrum allocation and power allocation have been proposed. These include water-filling (WF) algorithm for Nash equilibrium (NE), Stackelberg algorithm for Stackelberg equilibrium (SE) and distributed algorithms for joint power and channel allocation to tackle the problem of spectrum sharing where competitive operators coexist in the same frequency band. A problem with these proposals relates to signalling overhead, as a significant resource may be needed for enabling exchange of the necessary secondary channel information to achieve Stackelberg equilibrium, in particular if operators change dynamically.

Expansion from a multi-user single-channel arrangements to multi-user multi-channel arrangement is likely to complicate matters further. The current proposals try to find an optimum solution with real time information to the maximization of the total throughput of one user on all channels/carriers, and then expand to multi-users. The assumption is that each user maximizes its own bit rate. However, this does not take into account the damage caused to other users. This approach also ignores the dynamic nature of change in the interference from other users. However, a relatively large change in the interference from and to other users exists during in the configured time of collecting and sending information by spectrum management centers (SMC), and this can exaggerate the error between the approximate solution and the real optimal solution. On the other hand, the solution is such that the management center collects information from modems and generates some information and sends it to modems periodically. Thus a substantial amount of signalling between modems and the SMC is needed if there is large number of users, for example HeNBs, in a network.

It is noted that the above issues are not limited to any particular communication systems such as those provided by means of HeNBs, but may occur in any appropriate communication system comprising a plurality of local nodes. It is thus noted that the disclosure is not to be limited to distributed joint power and channel allocation (JPCA) in power and frequency resource allocation of a HeNB network but can equally be applied to resource allocation for generic small or local nodes for which limited resources only can be allocated and which may suffer from interference from each other.

Embodiments of the invention aim to address one or several of the above issues.

In accordance with an embodiment there is provided a method for resource allocation in a local wireless node of a system of a plurality of local wireless nodes, comprising performing inner circle subgradient resource allocation iteration based on information received from at least one other wireless node of the system and an iteration parameter until a convergent result, providing an updated iteration parameter by means of at least one outer circle subgradient iteration based on the convergent result of the inner circle subgradient resource allocation iteration, repeating the inner circle subgradient resource allocation iteration at least once using the updated iteration parameter until a convergent result, and allocating resources for the wireless node based on the iterations.

In accordance with another embodiment there is provided an apparatus for resource allocation in a wireless local node, the apparatus comprising at least one processor, and at least one memory including computer program code, wherein the at least one memory and the computer program code are configured, with the at least one processor, to perform inner circle subgradient resource allocation iteration based on information received from at least one other wireless node and an iteration parameter until a convergent result, provide an updated iteration parameter by means of at least one outer circle subgradient iteration based on the convergent result of the inner circle subgradient resource allocation iteration, repeat the inner circle subgradient resource allocation iteration at least once using the updated iteration parameter until a convergent result, and allocate resources based on the iterations.

In accordance with a more detailed embodiment power and/or channel allocation is provided as a result of the inner circle subgradient iterations. A Lagrangian multiplier may be updated by means of the outer circle subgradient iteration.

At least one value descriptive of the quality of the wireless path between the wireless node and the at least one other wireless node may be used in the iterations.

A subset of wireless nodes may be defined by a node. Information for use in resource allocation may be exchanged between the members of a subset of wireless nodes. The information can indicate a channel and its transmission power. The information may further indicate an associated iteration round. The information may be exchanged in association with the inner circle iterations.

Iterative resource allocation may be initiated by means of a trigger. The trigger may comprise a message from a central control apparatus, a mobile node or one of the other wireless nodes of the system. The iterations may also be triggered in response to an event causing a change in interference.

The resource allocation may be provided in a multi-node and multichannel environment, wherein the inner and outer circle iterations interact to provide globally optimal power allocations. Interference may be controlled by means of the iterative resource allocation in a system where the wireless nodes use the same frequency band.

A computer program comprising program code means adapted to perform the method may also be provided. The computer program may be provided on a computer readable medium.

Various other aspects and further embodiments are also described in the following detailed description and in the attached claims.

The invention will now be described in further detail, by way of example only, with reference to the following examples and accompanying drawings, in which.

In the following certain exemplifying embodiments are explained with reference to a communication system serving mobile communication devices. Before explaining in detail the exemplifying embodiments, certain general principles of a communication system, wireless nodes thereof, and mobile communication devices are briefly explained with reference to FIGS. 1 to 3 to assist in understanding the technology underlying the described examples.

Figure 1:
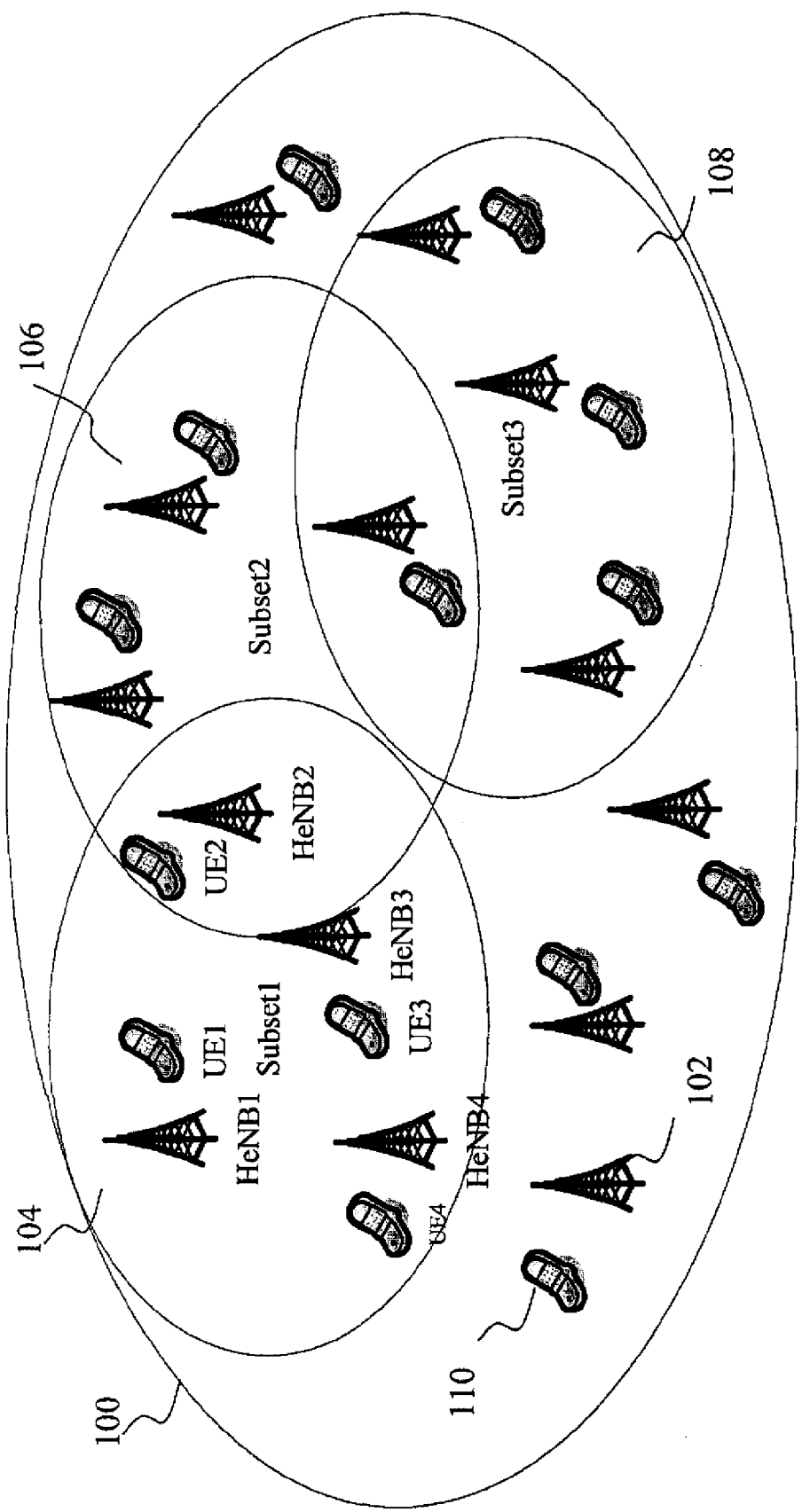
FIG. 1 shows a schematic diagram of a system of local nodes according to some embodiments.

A mobile communication device or user equipment 110 is typically provided wireless access via at least one base station or similar wireless transmitter and/or receiver node of a communication system 100. In FIG. 1 a plurality of neighbouring base stations 102 of the system 100 are shown. The stations 102 can provide overlapping radio coverage areas, and thus interfere with each other.

A base station is typically controlled by at least one appropriate controller apparatus so as to enable operation thereof and management of mobile communication devices in communication with the base stations. The control apparatus is not shown for clarity in FIG. 1, but will be explained later with reference to FIG. 3. The control apparatus of a base station can be interconnected with other control apparatus, for example the control apparatus of other base stations and/or a central controller entity.

The communication devices 110 can communicate with the communication system based on various access techniques, such as code division multiple access (CDMA), or wideband CDMA (WCDMA). Other examples include time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

A non-limiting example of the recent developments in communication system architectures is the long-term evolution (LTE) of the Universal Mobile Telecommunications System (UMTS) that is being standardized by the 3rd Generation Partnership Project (3GPP). As explained above, further development of the LTE is referred to as LTE-Advanced. Non-limiting examples of appropriate LTE access nodes are a base station of a cellular system, for example what is known as NodeB (NB) in the vocabulary of the 3GPP specifications. The LTE employs a mobile architecture known as the Evolved Universal Terrestrial Radio Access Network (E-UTRAN). Base stations of such systems are known as evolved or enhanced Node Bs (eNBs). Other examples of radio systems include those provided by base stations of systems that are based on technologies such as wireless local area network (WLAN) and/or WiMax (Worldwide Interoperability for Microwave Access).

FIG. 1 shows local base stations 102 which can be provided by local wireless nodes, for example Home eNBs. The coverage of these base stations may generally be smaller than the coverage of the wide area base stations. The coverage provided by the smaller nodes can overlap with the coverage provided by one or more of macro-eNBs. Although not shown, the local radio service areas can also overlap with each other. Thus signals transmitted in an area of a node can interfere with communications in the area of other nodes. Although not shown, the base stations 102 can be connected to a wider communications network. The local base stations can also be connected to each other by a communication link for sending and receiving data. The communication link can be any suitable means for sending and receiving data between the base stations. In certain embodiments the communication link can be an X2 link. Use of the same frequency band by the HeNBs is sometimes referred to as 'reuse 1' case in the LTE vocabulary.

Figure 2:
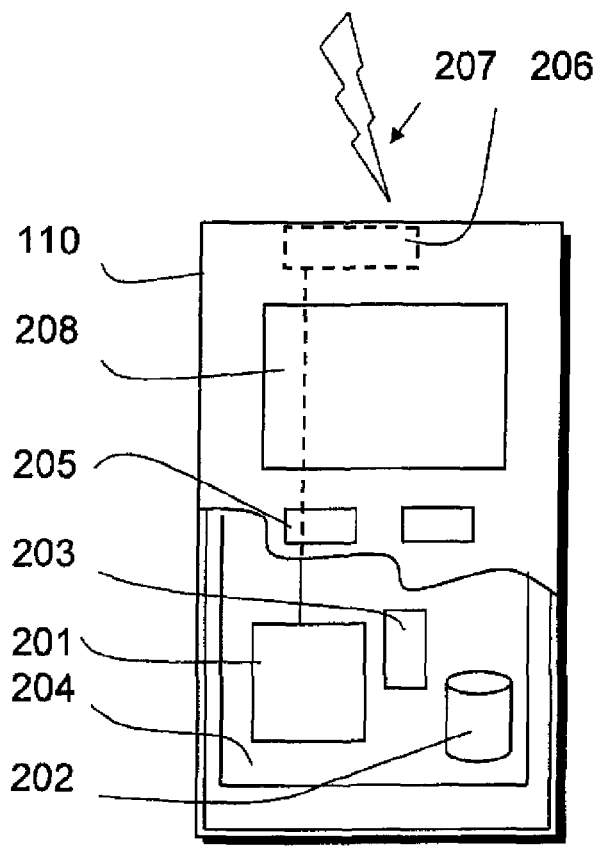
FIG. 2 shows a schematic diagram of a mobile communication device according to some embodiments.

The mobile communication devices will now be described in more detail with reference to FIG. 2. FIG. 2 shows a schematic, partially sectioned view of a communication device 110 that a user can use for communication. Such a communication device is often referred to as user equipment (UE) or terminal. An appropriate mobile communication device may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. User may also be provided broadcast or multicast data. Non-limiting examples of the content include downloads, television and radio programs, videos, advertisements, various alerts and other information. The mobile device 102 may receive signals over an air interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is also typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

Figure 3:
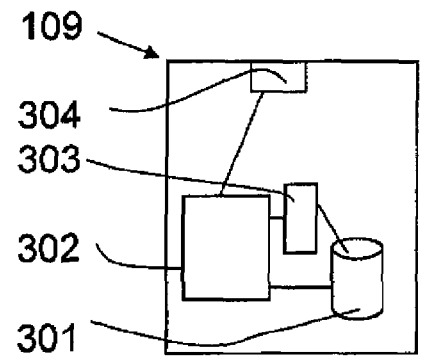
FIG. 3 shows a schematic diagram of a control apparatus according to some embodiments.

FIG. 3 shows an example of a control apparatus 109 for a communication system, for example to be coupled to and/or for controlling a base station 102 of FIG. 1. In some embodiments the base stations can comprise a separate control apparatus. In other embodiments the control apparatus can be another network element. The control apparatus 109 can be arranged to provide control on communications in the service area of the base station. The control apparatus 109 can be configured to provide control functions for causing resource allocation by means of the data processing facility in accordance with certain embodiments described below. For this purpose the control apparatus 109 comprises at least one memory 301, at least one data processing unit 302, 303 and an input/output interface 304. Via the interface the control apparatus can be coupled to a receiver and a transmitter of the base station. The control apparatus 109 can be configured to execute an appropriate software code to provide the control functions. It shall be appreciated that similar component can be provided in a control apparatus provided elsewhere in the system for configuring muting patterns and/or controlling coordination of muting the service areas. For example, a central control apparatus can provide at least a part of the functions, for example triggering, as will be described below.

The required data processing apparatus and functions of a base station apparatus, a mobile communication device, a central control apparatus and any other appropriate station may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In accordance with an embodiment interference caused by the local nodes 102 to each others can be addressed by an efficient frequency resource and power allocation on the assigned frequency resource. The detailed example below describes allocation schemes for mitigation of interference in a HeNB network based on the 3GPP Long-Term Evolution (LTE) and LTE-advanced. More particularly, a distributed solution for optimal mitigation of interference in HeNB network is described where interference management is based on autonomous power and channel allocation by means of a distributed self-adjusting interference management scheme. The distributed interference management is provided with relatively low signalling overhead.

In accordance with the embodiment cooperative distributed iterative inner and outer circle subgradient algorithms are executed by at least some or all HeNBs 102 to mitigate interference between the HeNBs. This can be provided in response to any mismatch between transmit power and the load or data rate requirement, for example when a new HeNB enters or leaves the HeNB network 100 or in response to another event such as in response to at least one HeNB experiencing severe interference. Another interferer may also cause a change in the interference experienced in the network. For example, a user equipment can change the interference in the network because of changes in downlink data rate requirements. A serving HeNB may have to increase its transmit power to support data rates required by a user equipment, thus increasing the interference to neighbour HeNBs. Such increase may be responded to by means of triggering resource allocation in response to a user equipment entering the network.

Figure 4:
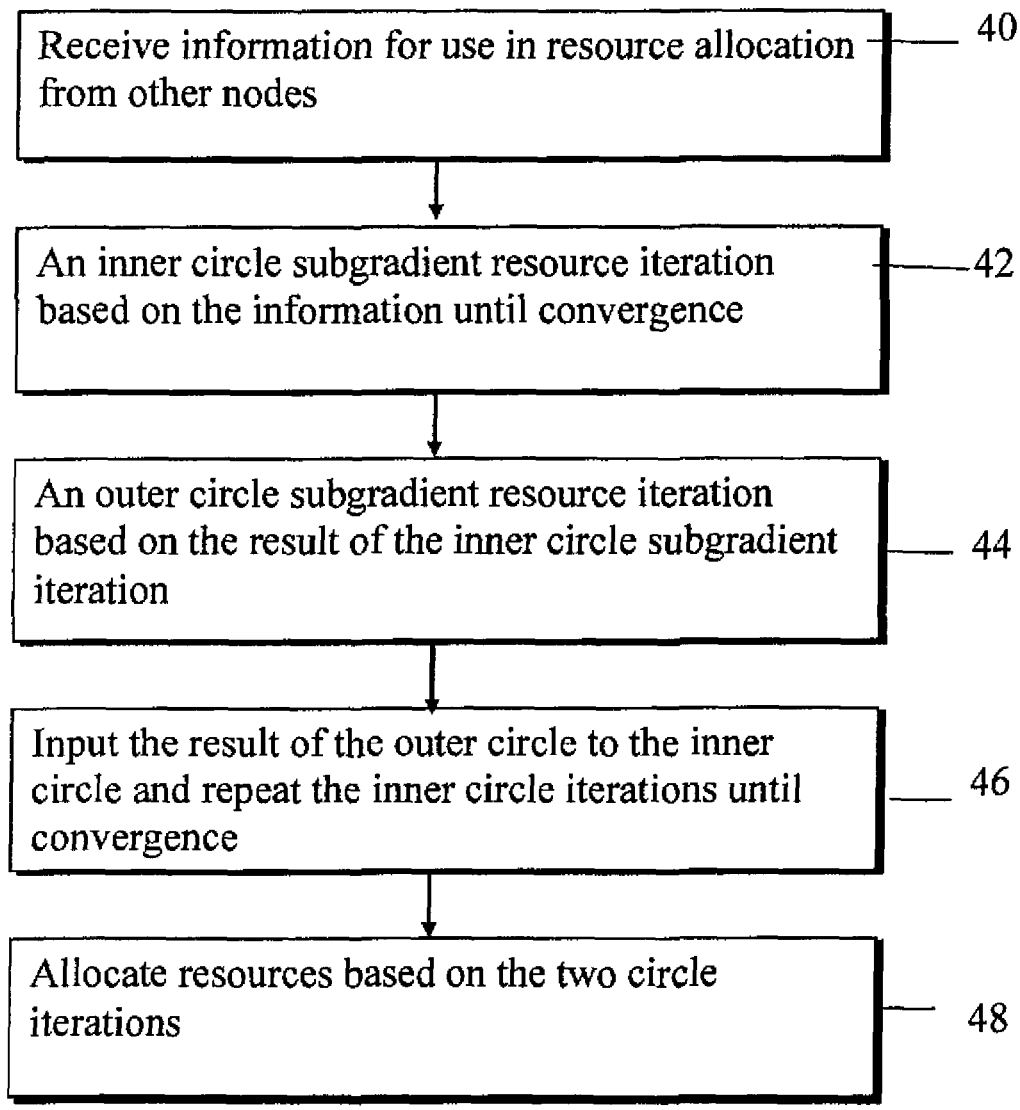
FIG. 4 shows a flow chart illustrating a method according to an embodiment.

FIG. 4 shows a method for resource allocation in a local wireless node operated in a system of a plurality of local wireless nodes. Information for use in resource allocation can be received from at least one other wireless node of the system at 40. The node receiving the information can also send information to the other nodes for the same purpose. Each node can, autonomously, perform an inner circle subgradient resource allocation iteration based on the received information to obtain a convergent result at 42. Once converged, an outer circle subgradient iteration can be performed at 44 based on the result of the inner circle subgradient iteration. The inner circle iteration is repeated based on the results of the outer circle iteration and any possible further information from the other nodes and/or measurements until the convergence. Once this has been achieved resources can be allocated at 48 for the wireless node.

In accordance with an embodiment a convergent power allocation is provided as a result of step 42, and is input to the second iteration at step 46. At this step an updated iteration parameter is provided and this is fed back to the inner iteration circle. The updated iteration parameter can then be used when repeating the inner circle iteration. The parameter may comprise a Lagrangian multiplier. Power and/or channel resources can be allocated for the local wireless node based on the final output of the two circles iteration functionality. The allocation can be based on a convergent output power value of each node on each channel of inner circle under a convergent Lagrangian multiplier value.

Each of the wireless nodes in the system can provide the same functions and exchange information with each other and allocate resources to itself based on the iterations. The nodes can define subsets thereof and exchange information only within the relevant subsets of nodes.

A two-circle distributed iterative subgradient algorithm may be used for joint power and channel allocation in a multi-node multi-channel scenario. The optimization may be based on use of Lagrange multipliers, as these provide a strategy for finding the maxima and minima of a function subject to constraints. Use of Lagrange multipliers is a powerful tool for solving this class of problems without the need to explicitly solve the conditions and use them to eliminate extra variables.

Figure 5:
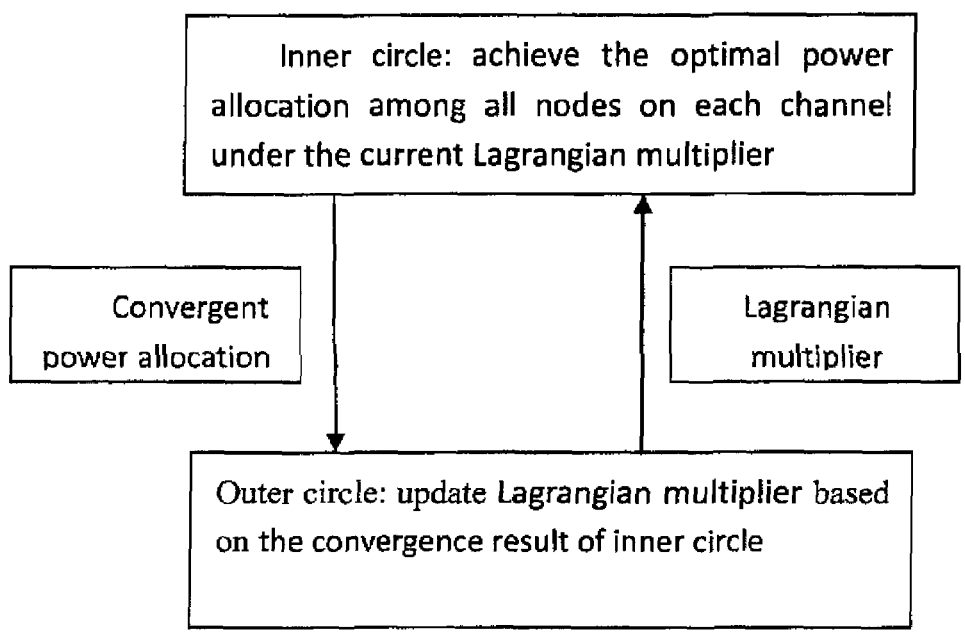
FIG. 5 shows a schematic representation of a two circle iteration.

For example, power allocation in multi-node, multi-channel scenario in inner circle based on Lagrangian multiplier and Lagrangian multiplier updating of outer circle can be arranged to interact with each other so that the power constraint is dualized in an optimal fashion. In this context Lagrangian duality can be understood as a concept of taking the constraints into account by augmenting the objective function with a weighted sum of the constraint functions. An example for such two-circle optimization is illustrated in FIG. 5.

In the example the inner circle power values received from all nodes in a set of nodes are iterated under the current Lagrangian multiplier value until convergence. The result of this iteration is then input in the outer circle. The Lagrangian multiplier can be updated by the outer circle based on the input result. The inner circle iteration can then be repeated under the updated Lagrangian multiplier until the Lagrangian multiplier value comes again to convergence. The last round of running of the inner circle can provide an optimal power allocation result.

An appropriate signalling mechanism between the wireless local nodes 102 can also be provided. Signalling can be used to denote relevant information exchanged within a subset of neighbouring HeNBs for the purpose of allocation of power and frequency resources. The relevant information can be, for example, $\omega_{i,n,k}$ where $\omega_{i,n,k}$ is a log function of the transmit power of a HeNB on the n-th channel in the k-th iteration.

As shown by FIG. 1, there can be a large number of local nodes such as HeNBs 102 in a network 100. Each HeNB can choose a predefined number, for example 3 to 4 neighbors HeNBs to form a subset. Each HeNB can form its own subset. FIG. 1 shows three subsets 104, 106 and 108. A HeNB can be included in one or more subsets. Within the subset, the HeNBs can exchange messages with each other. A HeNB collecting information for resource allocation purposes needs only to receive information from the other members in the subset, and can ignore information from other HeNBs. Based on information received from the neighbouring HeNBs', the processor apparatus of a HeNB can perform a cooperative distributed subgradient iteration in an inner circle to achieve an optimal power allocation among all nodes on each channel under the Lagrangian multiplier value in the current outer circle. On the other hand, Lagrangian multiplier which denotes the dual of the power constraints can be updated by each node of the subset in outer circle in a subgradient fashion. The subgradient search direction of outer circle can be based on the convergence result of inner circle in turn.

All HeNBs of a subset can run inner circle and outer circle algorithms to perform their own resource allocation in parallel. The results of the inner circle iterations can be exchanged amongst the members of the subset.

The signalling overhead can be considered as being of a linear proportion of the size of the subset. As there are only a few, for example 3-4 members in a subset the signalling cost can be kept relatively low. Also, HeNBs in areas where two HeNBs coverage areas overlap need to exchange the relevant optimization information only with the HeNBs of the overlapping subsets. Thus e.g. in FIG. 1 HeNB1 exchanges information only with nodes HeNB2-HeNB4. HeNB2 needs to exchange information with HeNB1, HenB3, HeNB4 and the members of subset 2 106.

Two different exemplifying scenarios for triggering a distributed optimal algorithm for joint power and channel allocation (JPCA) in a HeNB network are discussed in the following. In the first example a centralized control function configuration is provided. For example, a radio resource management (RRM) function or a macro level base station apparatus such as eNodeB can be configured to provide triggering of the herein described functionality. The central controller may send a trigger for configuration or send an actual configuration. For example, a RRM can configure that all HeNBs execute a joint power and channel allocation (JPCA) algorithm periodically, or order the HeNBs to execute JPCA algorithm temporarily, for example in response to a predefined event indicative a change in interference.

Figure 6:
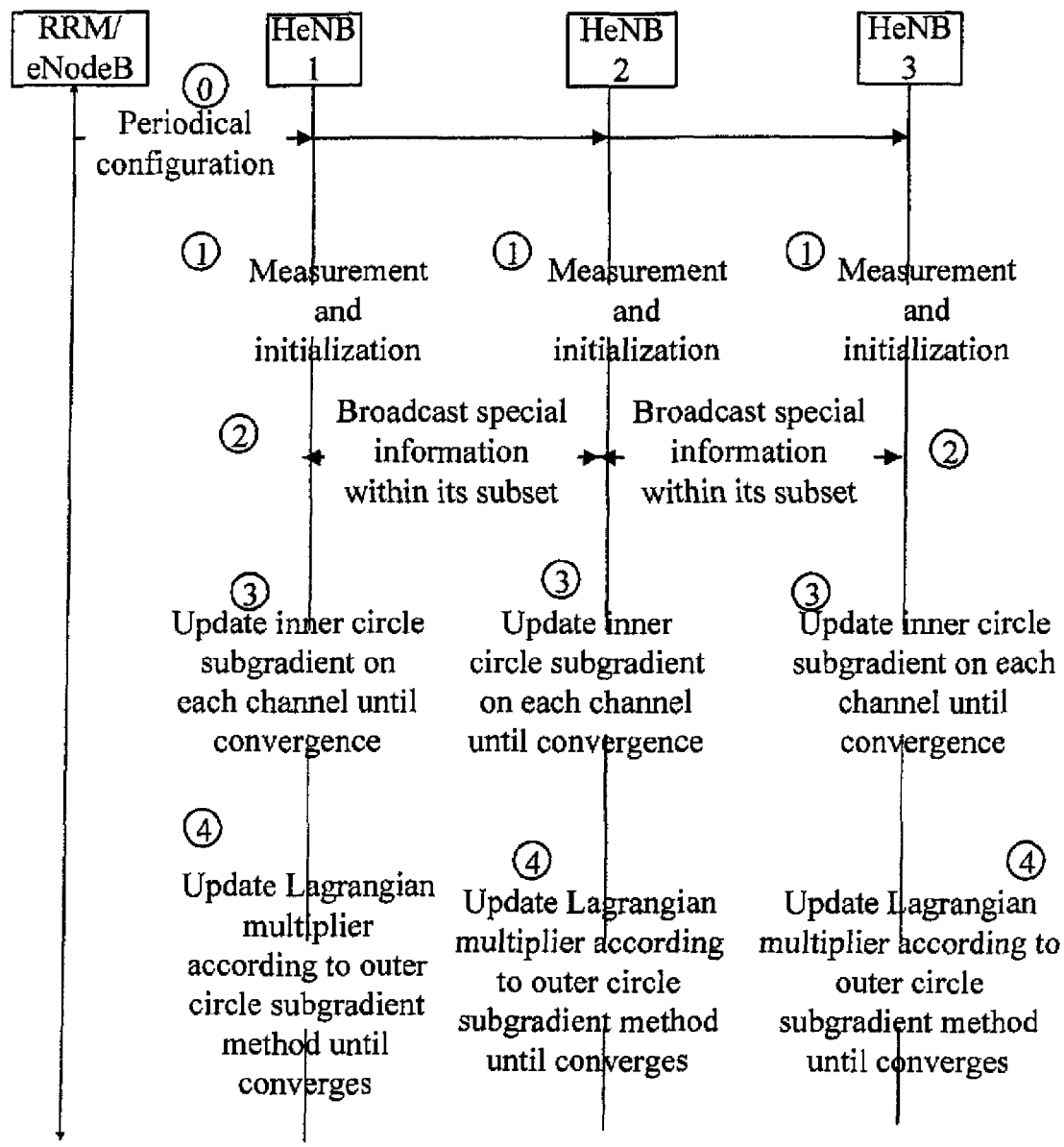
FIGS. 6 and 7 shows signalling flows for two exemplifying embodiment.

Signalling of a periodic configuration by a central control function is illustrated by the exemplifying signalling flow for the centralised configuration of FIG. 6. In this example it is assumed that there are three HeNBs in a subset, and that the central function governs this subset by means of sending periodic configurations. More particularly, at stage 0 a periodic configuration command is sent to HeNBs attached to the central function. At stage 1 each HeNB of the subset measures path loss to other HeNBs they can listen to. Based on this each HeNB can determine which ones of the neighbor HeNBs can be currently included in its subset. At this stage the control apparatus of each HeNB also initializes the value of the transmit power on each channel and its Lagrangian multiplier.

Once the subsets are known, at stage 2, each HeNB can send its information associated with transmitting power on all channels/carriers in the current iteration to other HeNB in the same subset. At stage 3 each HeNB can update the inner circle subgradient on each channel. A HeNB can repeat steps 1 to 3 until convergence has been achieved. After HeNB's iterations on all channels converge at the inner circle, the HeNB can update at stage 4 the subgradient of the outer circle iteration and repeat steps 1 to 4 until the outer subgradient iteration converges. After the outer subgradient iteration converges, steps 1 to 3 can be repeated until convergence. The power value after the convergence on the inner circle can be taken as the final power allocation of each HeNB on each channel.

Figure 7:
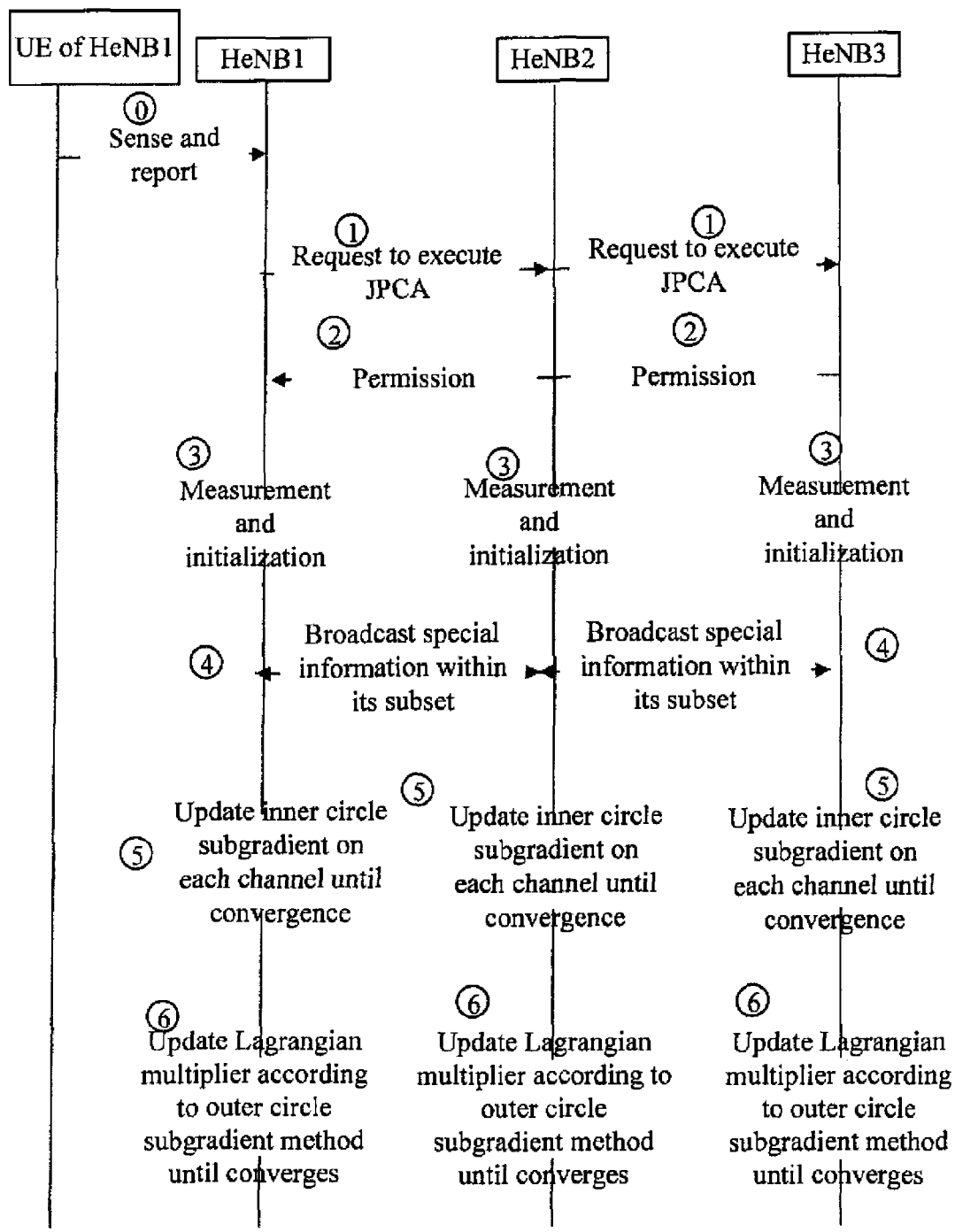

The second example is based on triggering in response to a predefined event. Reporting and event triggering of a joint power and channel allocation optimization functionality is shown in the flowchart of FIG. 7. For example, the triggering may occur in response to a new HeNBs entering or leaving a HeNB network, or in response to one or more of user equipments attached to a HeNB experiencing intolerable interference. However, other events may also be defined as providing a trigger the control function providing a distributed optimal algorithm for joint power and channel allocation (JPCA).

In FIG. 7 the following actions are taken, assuming that HeNBs1 to 3 form a subset. At the beginning, a user equipment can send information or a command message that triggers the function to HeNB1. At stage 1 HeNB1 can negotiate use of the iterative resource allocation scheme with the other nodes of the subset. For example, HeNB1 can sends a message, for example a JPCA request to HeNB2 and HeNB3, and HeNB2 and HeNB3 can then respond at stage 3 by sending a JPCA permission report to HeNB1.

Each HeNB can measure path loss to other HeNBs and determine which neighbor HeNBs can be included in its subset. The HeNBs can also initialize the transmit power on each channel and its Lagrangian multiplier at this stage. Each HeNB can then broadcast at stage 4 its current inner circle iterate of transmit power on all channels/carriers within the subset so that all HeNBs within the subset became aware of each others current iterates. Each HeNB can then calculate and update at stage 5 the inner circle subgradient on each channel and repeat this step together with step 2 until the inner circle subgradient iteration converges. After HeNB's inner circle subgradient iterates on all channel converges, HeNB can update at stage 6 the subgradient of the outer circle iteration (Lagrangian multiplier). Step 3 to 6 can be repeated until the outer circle iteration converges.

If a change in the power levels is considered necessary, the iterations will result adjusted power levels. Transmission at the new power levels in each channel/carrier by the HeNBs is expected to result a better network throughput.

Figure 8:
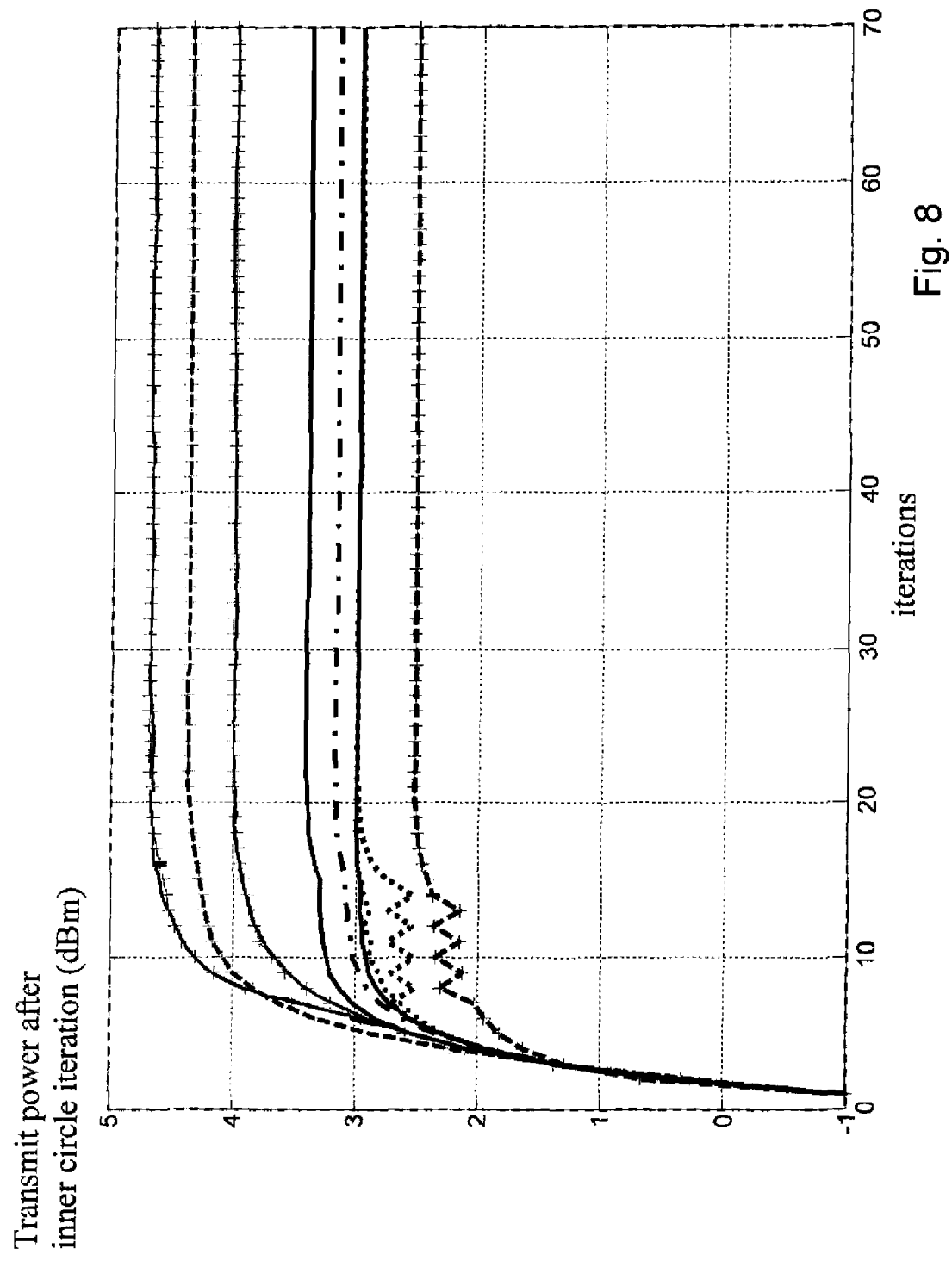
FIGS. 8 to 10 show results of simulations.
Figure 9:
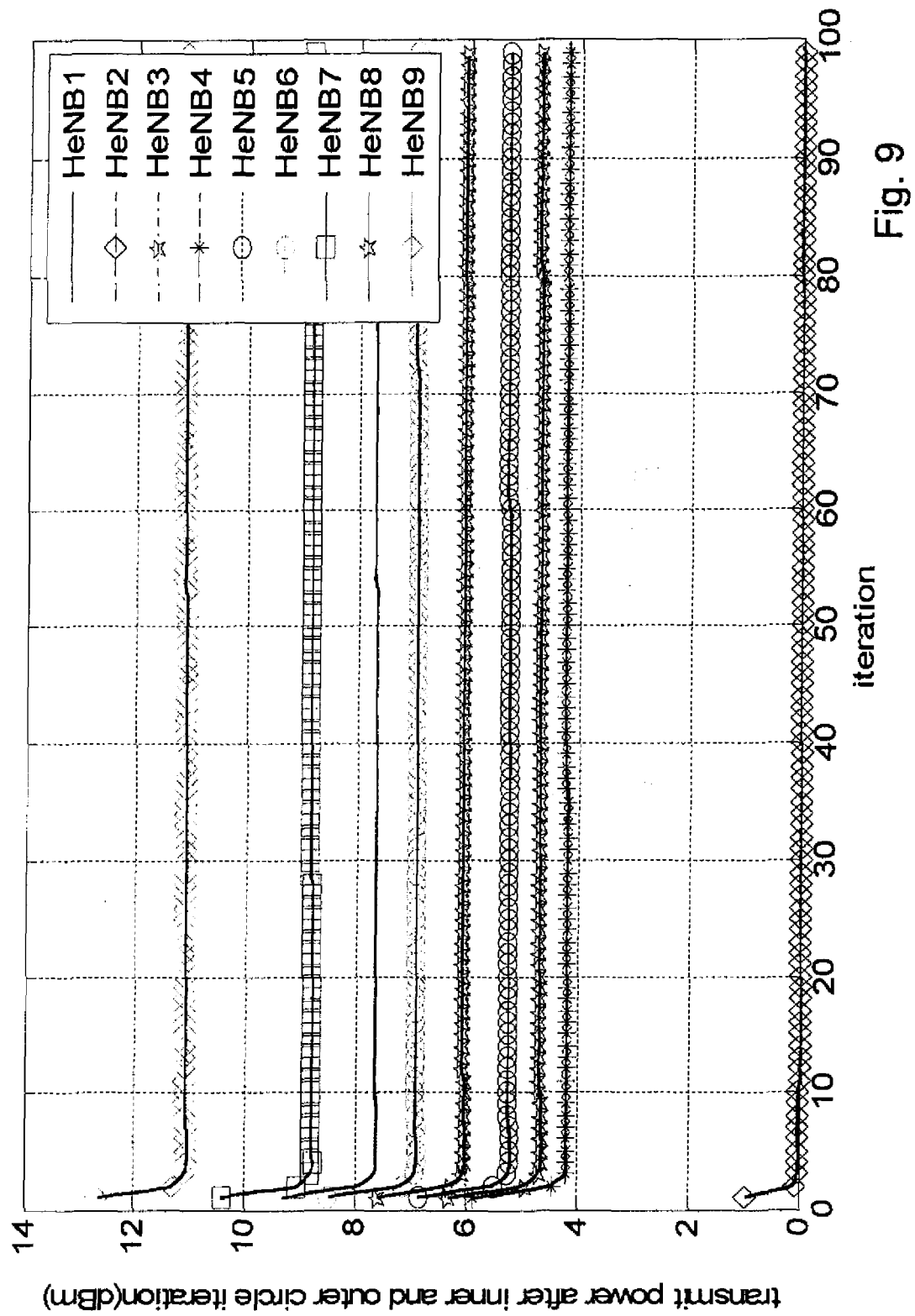
Figure 10:
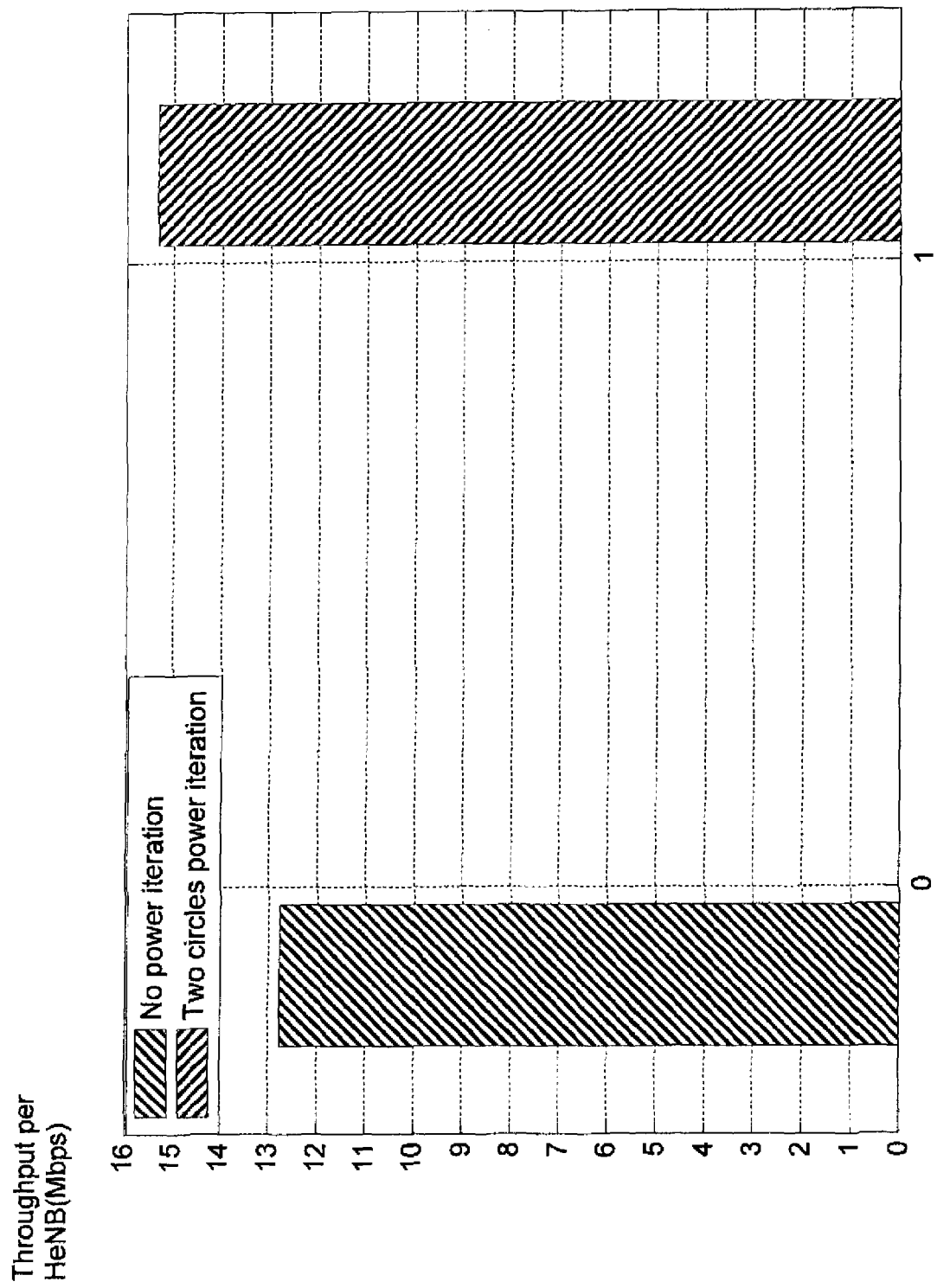

Simulations have been performed on the above described scheme. The simulation results indicate that the scheme can achieve better system throughput compared to a traditional 'reuse 1' scheme. The simulation results are illustrated in FIGS. 8 to 10. In the simulations the assumptions of Table 1 below were made.

TABLE 1

| | |
|---|---|
| Number of HeNBs | 9 |
| Number of UEs per HeNB | 1 |
| Number of channels | 5 |
| Bandwidth per channel (MHz) | 1 |

TABLE 1-continued

| | |
|---|---|
| Maximum transmit power of a HeNB (dBm) | 20 |
| Path loss model (dB) | $PL = \begin{pmatrix} 30*\log10(D) + 37; \text{indoor} \\ 30*\log10(D) + n*(5) + 37; \text{outdoor} \\ D\text{-distance; n-number of walls} \end{pmatrix}$ |
| Number of HeNBs in a subset | 2-5 |
| Step size of inner circle subgradient | $s_{inner} = \begin{pmatrix} 1/k^{0.7}; \text{if } s_{inner} > 1/1e3 \\ 1/1e3; \text{if } s_{inner} \le 1/1e3 \\ k\text{-inner iteration} \end{pmatrix}$ |
| Step size of outer circle subgradient | $s_{outer} = \begin{pmatrix} 0.1/l; \text{if } s_{outer} > 1/1e4 \\ 1/1e4; \text{if } s_{outer} \le 1/1e4 \\ l\text{-outer iteration} \end{pmatrix}$ |
| Number of iterations of inner circle | 70-1000 |
| Number of iterations of inner circle | 100-10000 |
| Objective function for optimization | $\sum_{n=1}^{N} \sum_{i=1}^{K} R_i^n$, N-channel; K-user; $R_i^n$-rate of user i on channel n. |

FIG. 8 shows the convergence of the inner circle power iteration of nine HeNBs (H1 to H9) on one channel. It can be seen that the power of each HeNB has converged after about 20 iterations. FIG. 9 shows, in turn, transmit powers after inner and outer circle subgradient iteration of HeNBs 1 to 9 and the convergence of the outer circle subgradient method. It can be seen that the two circle iterative subgradient method converges rather well. As is proved below in the mathematical considerations, the proposed algorithm can converge to a global optimum.

The mathematical background of the simulations is now explained to further clarify the objective function and decomposition of the dual problem. The objective function for joint power and channel allocation can be written by (for N-channels and M-users):

$$\max \sum_{n=1}^{N} T_n(x_n) \quad (1)$$

$$\text{s.t.} \sum_{n=1}^{N} x_n^T \le \overline{P}$$

Where $$x_n = (p_1^n, p_2^n, \ldots, p_M^n) \in R^M, \overline{P} = [\overline{P}_1, \overline{P}_2, \ldots, \overline{P}_M]^T \quad (2)$$

$(x_n)$ is concave in R and $$T_n = \sum_{i=1}^{M} R_i^n = \sum_{i=1}^{M} \log_2\left(\frac{p_i^n h_{ii}^n}{\sigma^2 + \sum_{j \ne i} p_j^n h_{ji}^n}\right)$$

is convex in R.

The Lagrangian dual function of the preliminary function can be given as:

$$L(x_n, \lambda) = \sum_{n=1}^{N} T_n(x_n) + \lambda^T \cdot \left(\overline{P} - \sum_{n=1}^{N} x_n^T\right) \quad (3)$$

Where
$\lambda = [\lambda_1, \ldots, \lambda_M]^T$ is a vector of Lagrangian dual variables.
The dual objective $d(\lambda)$ is an unconstrained maximization of the Lagrangian.

$$d(\lambda) = \max_{x_n} L(x_n, \lambda) \quad (4)$$

The dual problem is $$\min d(\lambda)$$

$$s.t. \lambda \geq 0 \quad (5)$$

Since $T_n(x_n)$ is concave and $x_n$ is convex, standard convex optimization results can be assumed to guarantee that the primal problem and the above dual problem have the same solution. Also $L(x_n, \lambda)$ is linear in $\lambda$ for each fixed $x_n$, and $d(\lambda)$ is the maximum of linear functions, and therefore it is convex. Thus a gradient-type search can be considered as being guaranteed to converge to the global optimum.

A search direction of the $d(\lambda)$ is $$d(\lambda') \geq d(\lambda) + D^T \square (\lambda' - \lambda) \quad (6)$$

$$D = \overline{P} - \sum_{n=1}^{N} x_n^T \quad (7)$$

The objective function of the optimization of total throughput of the HeNB network can be recalled by:

$$\max \sum_{n=1}^{N} T_n(x_n) = \max_{x_n} \sum_{i=1}^{M} \sum_{n=1}^{N} R_i^n(p_i^n) \quad (8)$$

$$R_i^n(p_i^n) = \log_2\left(\frac{p_i^n h_{ii}^n}{\sigma^2 + \sum_{j \neq i} p_j^n h_{ji}^n}\right) \quad (9)$$

Thus (8) can be written by:

$$d(\lambda) = \sum_{n=1}^{N} \max_{p_1^n, \ldots, p_M^n} \sum_{i=1}^{M} (R_i^n(p_i^n) - \lambda_i p_i^n) + \sum_{i=1}^{M} \lambda_i p_i^n \quad (10)$$

The optimum solution to the inner circle objective function:

$$s^l(p_i^n) = \sum_{i=l}^{M} R_i^n(p_i^n) - \lambda_i p_i^n \quad (11)$$

The iterative inner circle subgradient method can then be based on the following algorithm to find the optimal solution to the inner circle objective function (11)

$$\min \sum_{i=1}^{M} f_i(x) = \max s^l(p_i^n) = \max \sum_{i=1}^{M} (R_i(x) - \lambda_i x_i) \quad (12)$$

$$f_i(x) = -(R_i(x) - \lambda_i x_i) \quad (13)$$

This allows for e.g. 3 to 4 neighbouring HeNBs to form a subset, in which subset HeNBs can send information to each other. As shown in FIG. 1, a HeNB can access to more than one subset. Each HeNB can receive the current iterate of a subset of its neighbour HeNBs and calculate a weighted sum of all of iterates it has access to.

$$v_{ik} = \sum_{j \in N_i(k+1)} a_{i,j}(k+1) \omega_{j,k} \quad (14)$$

where $\omega_{j,k} = \log(x_{j,k})$ and $N_i(k+1)$ is the subset of node i in the k+1-th iteration.

$$\omega_{i,k+1} = P_X(v_{i,k} - \alpha_{k+1}(\nabla f(v_{i,k}) + \varepsilon_{i,k+1})) \quad (15)$$

where $$\nabla \tilde{f}_i(v_{i,k}) = -\frac{1}{\ln 2} * \frac{1}{v_{i,k}} + \lambda_i^l \quad (16)$$

$$\varepsilon_{i,k+1} = \frac{1}{\ln 2} * \sum_{j \neq i} \frac{|h_{ij}|^2}{\sigma_j^2 + \sum_{i \neq j} v_{i,k}|h_{ij}|^2} > 0$$

$\alpha_{k+1}$ is the inner circle subgradient step size.

In order to execute the parallel and distributed algorithm, $$\frac{1}{\ln 2} * \sum_{j \neq i} \frac{|h_{ij}|^2}{\sigma_j^2 + \sum_{i \neq j} x_i |h_{ij}|^2}$$

is treated as the bounded stochastic error in the evaluation of subgradient direction. Thus $\nabla f(v_{i,k})$ can be used as the search direction of inner circle subgradient.

In each iteration $\omega_i$ is less than the ideally value. So after iterations $\omega_i$ is less than $\omega_i^*$, that is $$\omega_{i,k} = \omega_{i,k}^* - \zeta_{i,k}, \quad (17)$$

where $\zeta_{i,k} = \alpha_k \varepsilon_{i,k} \geq 0$ is the error of the convergence point of the iteration compared to the optimal point.

The iterative outer circle subgradient can be obtained by turning the search to direction of $d(\lambda)$ $$\lambda^{l+1} = \left[\lambda^l - \beta^l\left(\overline{P} - \sum_n x_n\right)\right]^+ \quad (18)$$

That is $$\lambda_i^{l+1} = \lambda_i^l - \beta^l\left(\overline{P}_i - \sum_n x_n\right) \quad (19)$$

In the above power allocation in inner circle and Lagrangian multiplier updating of outer circle interact with each other so as to determine power constraints in an optimal fashion. Cooperative distributed subgradient iteration can achieve the optimal power allocation among all nodes on each channel under the Lagrangian multiplier value in the outer circle. Lagrangian multiplier which denotes the dual of the power constraints can be updated by each node in a subgradient fashion. The subgradient search direction of the outer circle can be based on the convergence result of inner circle in turn, as shown in FIG. 5. The above subgradient update can converge to the optimal $\lambda$ if $\beta'$ is chosen under sufficient conditions.

FIG. 9 shows a HeNB whose transmit power is 0, see HeNB2. This is acceptable since the objective function to be maximized is the total throughput of the whole network, so some HeNBs' transmit power can be relatively high and others relatively low, or even zero. However, the mechanism can be expanded to pursue fairness between HeNBs and to other objective too.

FIG. 10 shows a comparison of simulated throughputs per HeNB between the above described example and a scheme without the optimization. The throughput of the HeNB network is compared after inner power iteration in the conventional scheme, each HeNB's power being equal. That is, no power adjustment of HeNBs is provided in 'reuse 1' case on frequency resources. The throughput of the simulated scheme with optimization outperformed the conventional scheme by about 18%.

Thus a distributed optimal scheme for allocation of resources is provided with relatively low signaling overhead. The inner and outer circles can interact to provide a globally optimal power allocations to maximize the total throughput of a system under power constraints. The power adjustment can be based on self adjustment on multi-channels/carriers. The local nodes are enabled to adjust their transmit power on each channel/carrier according to the environment-awareness dynamically, based on the exchange of information of the recent iteration or iterations. Optimal results may be achieved because of real time interference avoidance. Signaling between local nodes can be exchanged by a direct link between nodes within a subset. The transmit powers of the local nodes can be dynamically adjusted by the inner and outer circle subgradient iteration. By appropriate number of iteration rounds, all nodes may achieve stable/convergent transmission power levels respectively. Some local node may achieve convergent earlier that the others.

It is noted that whilst embodiments have been described in relation to LTE-Advanced, similar principles can be applied to any other communication system where distributed resource allocation might be of benefit. Also, instead of channels/carriers provided by a fixed node these may be provided by a communication device such as a mobile user equipment. For example, this may be the case in application where no fixed equipment provided but a communication system is provided by means of a plurality of user equipment, for example in adhoc networks. Therefore, although certain embodiments were described above by way of example with reference to certain exemplifying architectures for wireless networks, technologies and standards, embodiments may be applied to any other suitable forms of communication systems than those illustrated and described herein.

It is also noted herein that while the above describes exemplifying embodiments of the invention, there are several variations and modifications which may be made to the disclosed solution without departing from the scope of the present invention. For example, the objective function for optimization can be expanded to the optimization of fairness between different nodes and so on. If subsets of nodes are used in resource allocation, it is also possible to have relatively large subsets of wireless nodes. For example, a subset including most of the nodes of a system is possible. Also, a common subset which includes all nodes of the system can be used. Although the above describes a Lagrangian multiplier which denotes the dual of the power constraints and update thereof by each node in outer circle in a subgradient fashion, other constraints can be used. Generally, if there are other constraints, these constraints can be formulated in the Lagrangian dual function, or other appropriate function.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. For example, a combination of one or more of any of the other embodiments previously discussed can be provided. All such and similar modifications of the teachings of this invention will still fall within the scope of this invention as defined in the appended claims.

The invention claimed is:

1. A method for resource allocation in a local wireless node of a system of a plurality of local wireless nodes, comprising:
   performing inner circle subgradient resource allocation iteration based on information received from at least one other wireless node of the system and an iteration parameter until a convergent result;
   providing an updated iteration parameter by at least one outer circle subgradient iteration based on the convergent result of the inner circle subgradient resource allocation iteration;

repeating the inner circle subgradient resource allocation iteration at least once using the updated iteration parameter until a convergent result; and allocating resources for the wireless node based on the iterations.

2. A method according to claim 1, comprising providing a power and/or channel allocation as a result of each inner circle subgradient resource allocation iteration.

3. A method according to claim 1, comprising updating a Lagrangian multiplier by the outer circle subgradient iteration.

4. A method according to claim 1, comprising measuring at least one value descriptive of the quality of the wireless path between the wireless node and the at least one other wireless node and defining a subset of wireless nodes based on the measurements.

5. A method according to claim 4, comprising communicating information for use in resource allocation with the members of the subset of wireless nodes.

6. A method according to claim 5, wherein the information communicated between the wireless nodes indicates a channel and its transmission power, and the associated iteration round.

7. A method according to claim 1, wherein the steps of inner circle iterations comprise receiving information from and/or sending information to the other wireless nodes.

8. A method according to claim 1, comprising performing negotiations with neighbouring nodes regarding use of the iterative resource allocation.

9. A method according to claim 1, comprising resource allocation in a multi-node and multichannel environment, wherein the inner and outer circle iterations interact to provide globally optimal power allocations.

10. A wireless node comprising an apparatus according to claim 1.

11. A wireless node according to claim 10, comprising a Home enhanced Node B.

12. An apparatus configured to send a trigger for the apparatus in accordance with claim 1 to trigger the iterative resource allocation.

13. An apparatus in accordance with claim 12 comprising a control node or a mobile user equipment.

14. An apparatus for resource allocation in a wireless local node, the apparatus comprising at least one processor, and at least one memory including computer program code, wherein the at least one memory and the computer program code are configured, with the at least one processor, to cause the apparatus to perform inner circle subgradient resource allocation iteration based on information received from at least one other wireless node and an iteration parameter until a convergent result;

provide an updated iteration parameter by at least one outer circle subgradient iteration based on the convergent result of the inner circle subgradient resource allocation iteration;

repeat the inner circle subgradient resource allocation iteration at least once using the updated iteration parameter until a convergent result; and allocate resources based on the iterations.

15. An apparatus according to claim 14, wherein the at least one memory and the computer program code are further configured, with the at least one processor, to cause the apparatus to provide power and/or channel allocation as a result of each inner circle subgradient resource allocation iteration.

16. An apparatus according to claim 14, wherein the at least one memory and the computer program code are further configured, with the at least one processor, to update a Lagrangian multiplier by the outer circle subgradient iteration.

17. An apparatus according to claim 14, wherein the at least one memory and the computer program code are further configured, with the at least one processor, to define a subset of wireless nodes based on at least one value relating to the quality of the wireless path between the wireless node and the at least one other wireless node.

18. An apparatus according to claim 14, wherein the at least one memory and the computer program code are further configured, with the at least one processor, to communicate information for use in resource allocation with the members of at least one subset of wireless nodes.

19. An apparatus according to claims 14, wherein the at least one memory and the computer program code are further configured, with the at least one processor, to receive information from and/or send information to the other wireless nodes in association with the inner circle iterations.

20. An apparatus according to claim 14, wherein the at least one memory and the computer program code are further configured, with the at least one processor, to perform negotiation with neighbouring nodes regarding use of the iterative resource allocation.

21. An apparatus according to claim 14, wherein the at least one memory and the computer program code are further configured, with the at least one processor, to allocate resources in a multi-node and multichannel environment, wherein the inner and outer circle iterations interact to provide globally optimal power allocations.

22. An apparatus according to claim 14, wherein the at least one memory and the computer program code are further configured, with the at least one processor, to control interference by the iterative resource allocation in a system where wireless nodes are using the same frequency band.

23. A non-transitory computer readable medium comprising computer program code adapted to perform resource allocation when the computer program code is run by a processor, the resource allocation comprising:

performing inner circle subgradient resource allocation iteration based on information received from at least one other wireless node of the system and an iteration parameter until a convergent result;

providing an updated iteration parameter by at least one outer circle subgradient iteration based on the convergent result of the inner circle subgradient resource allocation iteration;

repeating the inner circle subgradient resource allocation iteration at least once using the updated iteration parameter until a convergent result; and allocating resources for the wireless node based on the iterations.

24. The non-transitory computer readable medium according to claim 23, the resource allocation further comprising providing power and/or channel allocation as a result of each inner circle subgradient resource allocation iteration.

25. The non-transitory computer readable medium according to claim 23, the resource allocation further comprising updating a Lagrangian multiplier by the outer circle subgradient iteration.

26. The non-transitory computer readable medium according to claim 23, the resource allocation further comprising allocating resources in a multi-node and multichannel environment, wherein the inner and outer circle iterations interact to provide globally optimal power allocations.

27. The non-transitory computer readable medium according to claim 23, the resource allocation further comprising controlling interference by the iterative resource allocation in a system where wireless nodes are using the same frequency band.

* * * * *